May 31, 1949.  F. G. SHIPMAN  2,471,499
FISHING LURE
Filed July 19, 1946

INVENTOR.
Frank G. Shipman
BY Victor J. Evans & Co.
ATTORNEYS

Patented May 31, 1949

2,471,499

UNITED STATES PATENT OFFICE 2,471,499

FISHING LURE

Frank G. Shipman, Shelburn, Ind.

Application July 19, 1946, Serial No. 684,928

1 Claim. (Cl. 43—39)

The invention relates to a lure and more especially to a fishing lure.

The primary object of the invention is the provision of a lure of this character, wherein a plurality of side guards are arranged thereon, resembling minnows, and these being swiveled to effect protection to the hook, while located centered to the position of the guards is a spinner, which gives a retrieving activity to the lure, the latter being particularly adaptable for bass fishing, and is novel in construction and unique in the assembly of its parts.

Another object of the invention is the provision of a lure of this character, wherein its construction renders it serviceable for casting and trolling, and the hook is maintained in a vertical position with its pointed bill uppermost during the fishing period, the guards being effective as floating mediums to sustain the hook with its bill vertical.

A further object of the invention is the provision of a lure of this character, which is simple in construction, thoroughly reliable and efficient in operation, strong, durable, possessed of few parts, compact, and inexpensive to manufacture.

With these and other objects in view the invention consists in the features of construction, combination and arrangement of parts as will be hereinafter more fully described, illustrated in the accompanying drawing, which discloses the preferred embodiment of the invention, and pointed out in the claim hereunto appended.

In the accompanying drawing.

Similar reference characters indicate corresponding parts throughout the several views in the drawing.

Figure 1:
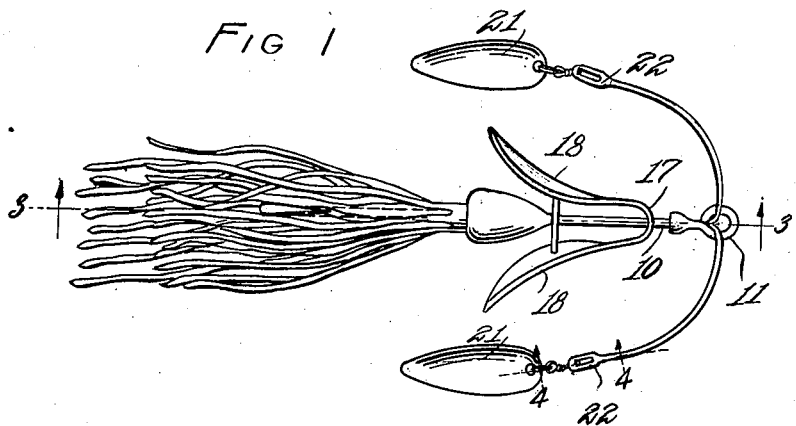
Figure 1 is a top plan view of the lure constructed in accordance with the invention.
Figure 2:
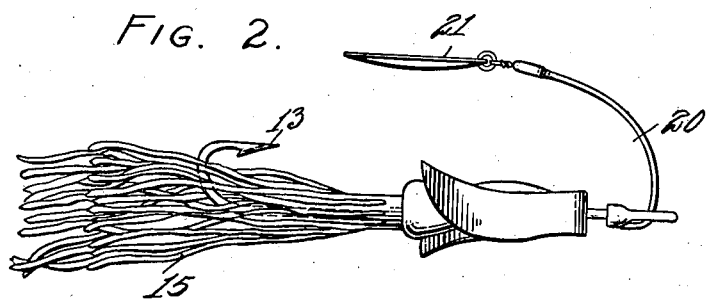
Figure 2 is a side view thereof.
Figure 3:
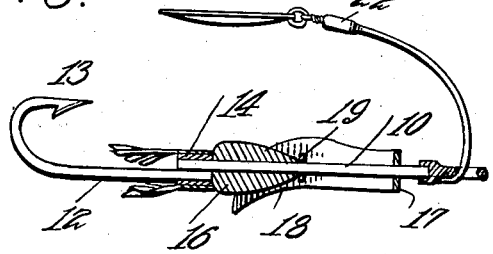
Figure 3 is a sectional view taken on the line 3—3 of Figure 1 looking in the direction of the arrows.
Figure 4:
Figure 4 is a fragmentary sectional view taken approximately on the line 4—4 of Figure 1 looking in the direction of the arrows.

Referring to the drawing in detail, the lure constituting the present invention, comprises a shaft-like stem or shank 10, which is straight throughout its length, having an eye terminal 11, for the attachment to a fishing line, not shown, while at the other or aft end of this stem or shank is a fishing hook 12, provided with a hooking bill 13, the shank of the said hook 12 being made secure by a ferrule 14 to the stem or shank 10. The ferrule 14 has equipped therewith a bucktail 15, which may be of any construction or dispensed with if desired.

On the stem or shank 10 next to the ferrule 14 is a cone-shaped member 16 which constitutes a float to the lure, and journaled on the said stem or shank 10 between the eye terminal 11 and the said member 16 is a spinner in the form of a substantially V-shaped frame 17, having the rearwardly divergent outwardly curved and slightly twisted propeller blades 18, there being a bridge piece 19 between the latter, which are disposed at opposite sides of the stem or shank 10, and the said frame rotates on the said stem or shank when the lure is drawn through the water.

Secured to the terminal 11 at the juncture thereof, to the stem or shank 10 are the leaders 20 to a pair of metal minnows 21, that is to say, imitative of life-like ones, these minnows being connected to the leaders 20, which are laced or trained through the eye terminal 11, by swivel couplings 22, and such minnows 21 are disposed on opposite sides of the hook 12 and at an elevated plane thereto.

What is claimed is:

In a fish lure, the combination which comprises a longitudinally disposed stem having an eye at the forward end and a bushy fibrous tail with a fish hook embedded therein extended from the opposite end, a float mounted on said stem, a spinner having an arcuate nose with outwardly flared propeller blades extended rearwardly therefrom rotatably mounted on said stem, a pair of outwardly bowed, arcuate leaders extended from the eye at the forward end of the stem and extending rearwardly, and arcuate blades shaped to represent minnows flexibly connected to the ends of the leaders and positioned to be influenced by churning water from the blades of the spinner.

FRANK G. SHIPMAN.

REFERENCES CITED

The following references are of record in the file of this patent:

UNITED STATES PATENTS

| Number | Name | Date |
|---|---|---|
| 536,185 | Cook | Mar. 26, 1895 |
| 1,995,985 | Jennings | Mar. 26, 1935 |
| 2,332,400 | Richardson | Oct. 19, 1943 |